United States Patent
Rassool

(10) Patent No.: US 9,392,344 B2
(45) Date of Patent: *Jul. 12, 2016

(54) AUDIO/VIDEO IDENTIFICATION WATERMARKING

(71) Applicant: Google Inc., Mountain View, CA (US)

(72) Inventor: Reza P. Rassool, Stevenson Ranch, CA (US)

(73) Assignee: Google Inc., Mountain View, CA (US)

(*) Notice: Subject to any disclaimer, the term of this patent is extended or adjusted under 35 U.S.C. 154(b) by 190 days.

This patent is subject to a terminal disclaimer.

(21) Appl. No.: 14/167,309

(22) Filed: Jan. 29, 2014

(65) Prior Publication Data

US 2014/0150111 A1    May 29, 2014

Related U.S. Application Data

(63) Continuation of application No. 11/695,507, filed on Apr. 2, 2007, now Pat. No. 8,683,601.

(60) Provisional application No. 60/744,888, filed on Apr. 14, 2006.

(51) Int. Cl.
*H04N 21/835* (2011.01)
*G10L 19/018* (2013.01)
(Continued)

(52) U.S. Cl.
CPC ............ *H04N 21/835* (2013.01); *G10L 19/018* (2013.01); *H04N 19/467* (2014.11); *H04N 21/8358* (2013.01)

(58) Field of Classification Search
CPC ............. G10L 19/018; H04N 21/8358; H04N 19/467; H04N 2201/323
See application file for complete search history.

(56) References Cited

U.S. PATENT DOCUMENTS

| 4,535,355 A | 8/1985 | Arn et al. |
| 5,870,474 A | 2/1999 | Wasilewski et al. |

(Continued)

FOREIGN PATENT DOCUMENTS

| EP | 0886409 | 12/1998 |
| WO | WO 01/93212 | 12/2001 |

OTHER PUBLICATIONS

Wu, Shaoquan et al., "Efficiently Self-Synchronized Audio Watermarking for Assured Audio Data Transmission," IEEE Transaction on Broadcasting, vol. 51, No. 1, Mar. 2005, pp. 69-76.

(Continued)

*Primary Examiner* — Ellen Tran
(74) *Attorney, Agent, or Firm* — Fenwick & West LLP

(57) ABSTRACT

The invention is directed to marking audio/video (A/V) signals for use in tracing content to a source. An ID controller captures an A/V synchronization fingerprint from a master A/V signal, stores the fingerprint in a data store, and provides signals to an ID encoder to have encoded an identifier into a copy of the master A/V signal. The identifier is encoded to be persistent through actions such as capture, compression, and/or transcoding. In one embodiment, the identifier is encoded as a bit sequence, where each bit is encoded using an encoding technique that is hereinafter called a Mississippi encoding technique. The encoded identifier within the copied A/V signal may later be determined by extracting the fingerprint and comparing it to the stored fingerprint to determine the identifier. The identifier may then be used to trace a source of the copied A/V signal.

21 Claims, 9 Drawing Sheets

(51) Int. Cl.
*H04N 21/8358* (2011.01)
*H04N 19/467* (2014.01)

(56) References Cited

U.S. PATENT DOCUMENTS

| | | |
|---|---|---|
| 5,991,399 A | 11/1999 | Graunke et al. |
| 6,285,774 B1 | 9/2001 | Schumann et al. |
| 6,415,031 B1 | 7/2002 | Colligan et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0089410 A1 | 7/2002 | Janiak et al. |
| 2002/0104004 A1 | 8/2002 | Couillard |
| 2002/0141582 A1 | 10/2002 | Kocher et al. |
| 2005/0105726 A1 | 5/2005 | Neubauer et al. |
| 2005/0123168 A1 | 6/2005 | Wendt |
| 2006/0212704 A1 | 9/2006 | Kirovski et al. |
| 2007/0030996 A1 | 2/2007 | Winger et al. |
| 2007/0047442 A1 | 3/2007 | Snyder |
| 2007/0220265 A1 | 9/2007 | Lemma et al. |

OTHER PUBLICATIONS

Wu, Tsung-Li et al., Selective Encryption and Watermarking of MPEG Video (Extended Abstract), Feb. 17, 1997, International Conference on Image Science, Systems, and Technology, 10 pgs.
PCT International Search Report and Written Opinion mailed on Jan. 15, 2008 for International Application No. PCT/US07/65925, 11 pgs.
Office Action for U.S. Appl. No. 11/695,507, Apr. 23, 2013, 21 Pages.
Office Action for U.S. Appl. No. 11/695,507, Jan. 3, 2011, 22 Pages.
Office Action for U.S. Appl. No. 11/695,507, Jul. 20, 2010, 17 Pages.

AUDIO/VIDEO IDENTIFICATION WATERMARKING

CROSS REFERENCE TO RELATED APPLICATIONS

This application is a Continuation of U.S. application Ser. No. 11/695,507, entitled "Audio/Video Identification Watermarking," filed Apr. 2, 2007, which in turn claims the benefit of U.S. Provisional Application Ser. No. 60/744,888, entitled "System And Method For Video Identification Watermarking," filed on Apr. 14, 2006, both of which are incorporated by reference.

TECHNICAL FIELD

The present invention relates generally to copy protection and more particularly but not exclusively to marking audio/video (A/V) signals for use in tracing pirated copies to a source and/or auditing the legitimate distribution of content.

BACKGROUND

Recent advances in the telecommunications and electronics industry have led to growth in new digital services to a user's home. While these advances provide new opportunity for profits to content owners, they also create a tremendous risk for piracy of the content. Without appropriate protection, the content can be illicitly intercepted, stolen, copied, and redistributed, thus depriving content owners of their profits. For example, a downstream recipient may select to produce multiple copies of the content. In some instances, the downstream recipient might even obtain a master recording of the content on a Digital Video Disk (DVD), a videotape, and the like, and employ today's technology to produce copies of the content. While in some instances, such duplicates may be legitimate, such as might arise when a distributor makes multiple copies of the content for rental, other instances may be unauthorized. In any event, because such copies may not be easily distinguishable from each other, there is a need in the industry to augment existing audio/video duplication operations with a system to uniquely identifier each audio/video copy. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
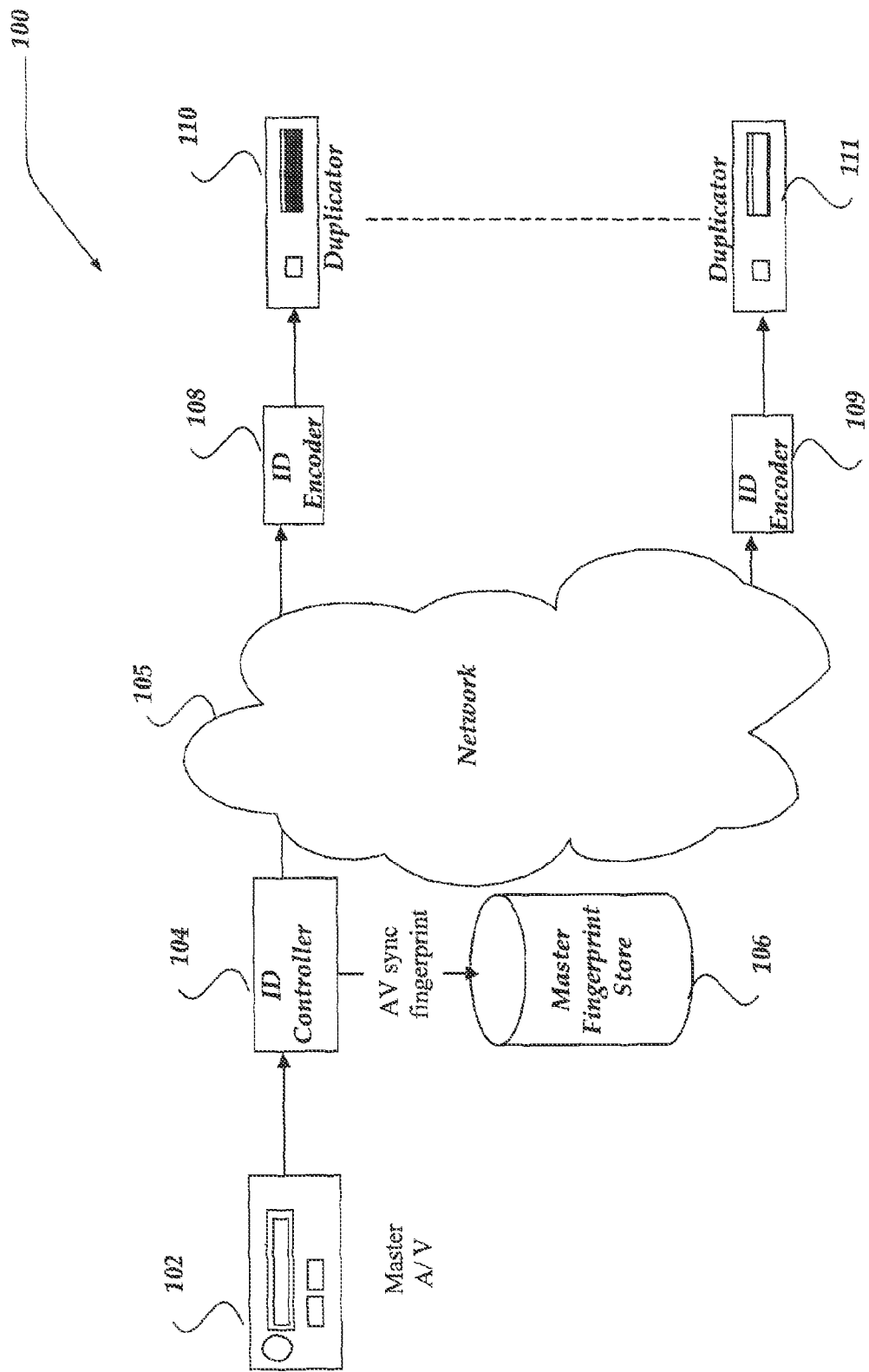
FIG. 1 shows a functional block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, apparatus, and method for marking audio/video (A/V) signals for use in tracing pirated copies to a source, and/or for auditing legitimate distributions of such A/V signals. The invention describes a system including an identification (ID) controller and at least one ID encoder component. The ID controller captures an A/V synchronization fingerprint (or simply "fingerprint") from a master A/V signal, and stores the fingerprint in a data store. The ID controller provides signals to the ID encoder to set, increment, or override a unique identifier to be associated with a copy of the master A/V signal to be produced. The unique identifier is then encoded into the copy such that it is invisible to normal viewing; inaudible to normal hearing; and is persistent through such actions as capture, compression, and transcoding. In one embodiment the unique identifier may be inserted into the copy multiple times throughout the copy so that a subsequent copy of a subset of the first copy may still include the unique identifier. In one embodiment, the unique identifier is encoded into the copy of the A/V signal, by modifying the A/V synchronization of the A/V signal as it is being copied. The modification is performed within a wow-and-flutter specification of most video recording devices. The identifier may be encoded using a synchronization drift that introduces less than a $\forall$ 1 field of synchronization difference between the audio and video components of the A/V signal at any point in time. In one embodiment, the identifier is encoded as a bit sequence, where each bit is encoded using a novel encoding technique that is hereinafter called a Mississippi encoding technique.

The encoded identifier within the copied A/V signal may later be determined by extracting the fingerprint. The extracted fingerprint from the copied A/V signal may be compared to the stored fingerprint from the master A/V signal to determine the identifier. The identifier may then be used to trace a source of the copied A/V signal, or perform a variety of other actions, including, but not limited to determining an authorized copying and sending a notice, or the like, to the copier, auditing legitimate copying, providing advertisements, promotions, discounts, or similar benefits, to legitimate copiers, or the like.

Illustrative Environments

FIG. 1 shows a functional block diagram illustrating one embodiment of operating environment 100 in which the invention may be implemented. Operating environment 100 is only one example of an environment in which an A/V signal may be distributed, and is not intended to suggest any limitation as to the scope of use or functionality of the present invention. Thus, other well-known environments and configurations may be employed without departing from the scope or spirit of the present invention. Operating environment 100 may be employed to integrate an identification tracking mechanism into an A/V duplication system.

As shown in the figure, operating environment 100 includes master A/V 102, ID controller 104, master fingerprint store 106, network 105, ID encoders 108-108, and duplicators 110-111. ID controller 104 is in communication with master A/V 102 and fingerprint store 106. ID encoder 108 is in communication with duplicator 110, while ID encoder 109 is in communication with duplicator 111. Network 105 is in communication with ID controller 104 and ID encoders 108-109.

Master A/V 102 includes virtually any device that is configured to provide an A/V signal to another device, such as ID controller 104. The A/V signal, designated as a master A/V signal, may be provided over a network (not shown), similar to network 105. The A/V signal may also be provided over virtually any other medium, including Video Compact Discs (VCDs), Digital Versatile Discs (DVDs), high definition DVD, Super Video CD (SVCD), Super Audio CD (SACD), Video Home System (VHS), Super-VHS, Data-VHS, Blu-ray, or the like. Devices that may operate as master A/V 102 include television appliances, A/V cameras, videocassette recorders (VCRs), digital-VCRs, VideoTape Recorder (VTRs), set-top boxes, mobile devices, personal digital assistants (PDAs), jukeboxes, personal computers, desktop computers, multiprocessor systems, microprocessor-based or programmable consumer electronics, network PCs, servers, and the like.

One embodiment of ID controller 104 is described in more detail below in conjunction with FIG. 3. Briefly, however, ID controller 104 includes virtually any device that is configured to receive a master A/V signal that may be duplicated. ID Controller 104 is arranged to extract from the master A/V signal an A/V synchronization fingerprint, or simply fingerprint, for use in tracking duplicates of the master A/V signal. In one embodiment, the fingerprint may be obtained from a low pass filtered energy envelope of the A/V signal's audio component synchronized with a Joint Photographic Experts Group (JPEG) word count of the associated video component. ID Controller 104 may be further configured to provide the extracted fingerprint to fingerprint store 106.

ID controller 104 may also be configured to provide control signals, and other information to ID encoders 108-109 to direct at least some of their actions. For example, ID controller 104 may determine a base identifier value for each of ID encoders 108-109. ID controller 104 may further signal each of ID encoders 108-109 when to increment the base identifier value, such that each duplicated A/V signal may be encoded with a unique identifier. In another embodiment, ID controller 104 may be configured to signal ID encoders 108-109 to employ a locally stored or derived identifier such as a MAC address, network address, or other unique local device identifier.

Devices that may operate as ID controller 104 include personal computers, desktop computers, multiprocessor systems, microprocessor-based or programmable consumer electronics, network PCs, servers, and the like.

Fingerprint store 106 may include virtually any device that is configured to receive, store, and manage an A/V synchronization fingerprint. As such, fingerprint store 106 may be implemented as a memory device, CD, DVD, hard disk drive, and the like. Moreover, fingerprint store 106 may include a database, a file, a document, a spreadsheet, and the like. In one embodiment, fingerprint store 106 may reside in a same device as ID controller 104. However, fingerprint store 106 may also be configured and arranged to reside within another device, distinct from ID controller 104, without departing from the scope of the invention.

Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one computing device and another computing device.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

ID encoders 108-109 include virtually any device that is configured to receive an A/V signal to be duplicated, accessed, retransmitted, or played, and to encode the audio component of the A/V signal with a unique identifier. In one embodiment, ID encoders 108-109 encode the unique identifier into a copy of the A/V signal, by modifying the A/V synchronization of the A/V signal as it is being copied. In one embodiment, the identifier may be encoded using a synchronization drift that introduces less than about a ∀ 1 field of synchronization difference between the audio and video components of the A/V signal at any point in time. In one embodiment, the identifier is encoded as a bit sequence, where each bit is encoded using the Mississippi encoding technique. However, the invention is not so constrained, and other bit sequence encoding techniques may be employed, including the Manchester encoding scheme, the Non-Return to Zero (NRZ) encoding scheme, the Return to Zero (RZ), NRZ Invertive (NRZ-I), Multi-Level Transition 3 (MLT-3), and so forth, may be employed, without departing from the scope or spirit of the invention. Moreover, ID encoder 108-109 may insert the unique identifier into the copied A/V signal multiple times throughout the copy so that a subset of the copy may still include the unique identifier.

ID encoders 108-109 are further configured to receive information from ID controller 104 that directs at least a portion of their actions. For example, ID encoders 108-109 may receive information that enables ID encoders 108-109 to establish a base identifier value, to increment the base identifier value, and/or the like. ID encoders 108-109 may, for example, employ a process such as described below in conjunction with FIG. 8.

Devices that may operate as ID encoders 108-109 include personal computers, desktop computers, multiprocessor systems, microprocessor-based or programmable consumer electronics, network PCs, servers, embedded programmable devices, and the like.

Duplicators 110-111 include virtually any device that is configured to receive an A/V signal and to duplicate the signal by making one or more copies. Duplicators 110-110 may copy the A/V signal onto virtually any medium, including a memory device, CD, DVD, hard disk drive, high definition DVD, SVCD, SACD, VHS, Super-VHS, Data-VHS, and the like. Devices that may operate as duplicators 110-111 include television appliances, A/V cameras, VCRs, digital-VCRs, VTRs, set-top boxes, mobile devices, PDAs, jukeboxes, personal computers, desktop computers, multiprocessor systems, microprocessor-based or programmable consumer electronics, network PCs, servers, and the like. In one embodiment, as described below, an ID encoder may be implemented within a duplicator.

Figure 2:
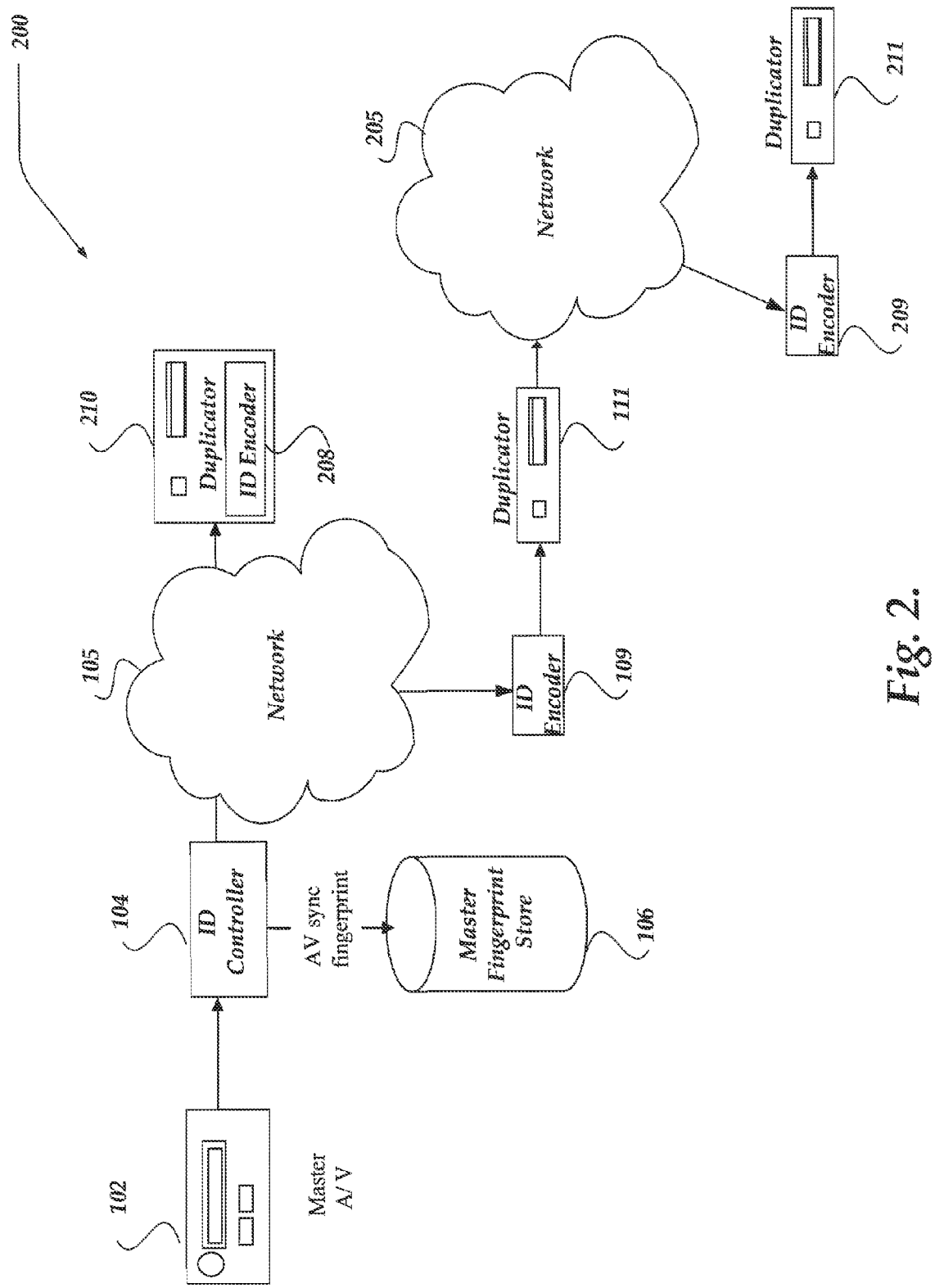
FIG. 2 shows a functional block diagram illustrating an embodiment of another environment for practicing the invention.

FIG. 2 shows a functional block diagram illustrating another embodiment of an operating environment 200 in which A/V signals may be distributed, and such distributions may be tracked. As shown, operating environment 200 includes like components of operating environment 100 of FIG. 1. However, operating environment 200 further includes network 205, duplicators 210-211, and encoders 208-209.

Network 205 may operate substantially similar to network 105 of FIG. 1. Duplicators 210-211 may operate substantially similar to duplicators 110-111 of FIG. 1. Moreover, ID encoders 208-209 may also operate substantially similar to ID encoders 108-109 of FIG. 1. However, as shown, duplicator 210 may include ID encoder 208.

As disclosed in FIG. 2, A/V signals may be sent from duplicator 111 over network 205 to ID encoder 209, wherein, in one embodiment, another identifier may be encoded within the A/V signals prior to providing it to duplicator 211. Thus, in one embodiment, an A/V signal may include a plurality of possible encoded identifiers. A/V signals may also be provided to ID encoder 209 using any of a variety of other transport mechanisms, other than network 205. For example, A/V signals may also be provided using any of a variety of portable storage devices, including, without out limit, a USB device, a compact disk, a removable storage device, or the like.

Illustrative Computer Environments

Figure 3:
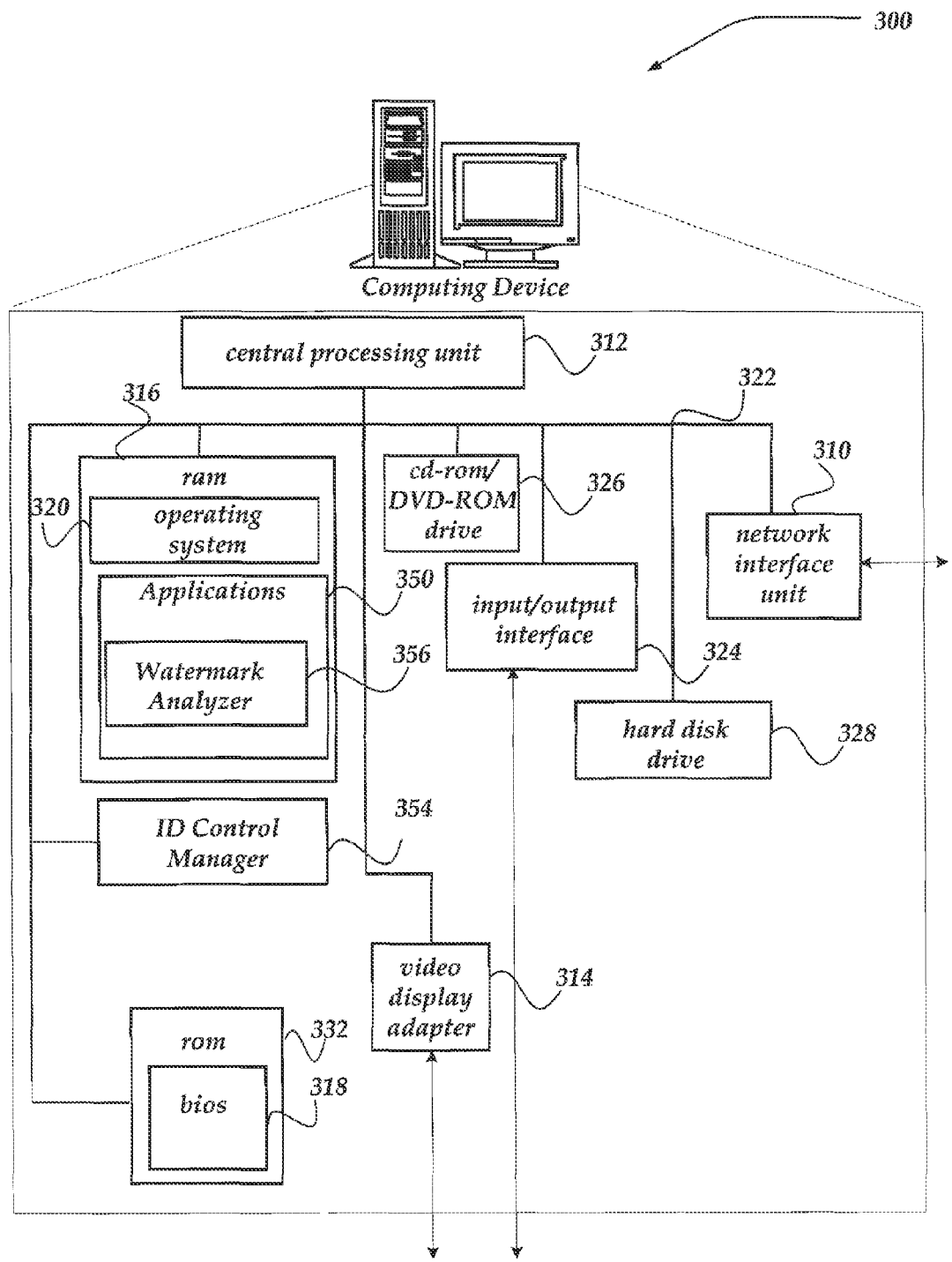
FIG. 3 shows one embodiment of a computing device configured and arranged to determine at least a fingerprint from an A/V signal.

FIG. 3 shows one embodiment of a computing device configured and arranged to determine at least a fingerprint from an A/V signal. Computing device 300 may include many more components than those shown. The components shown, however, are sufficient to disclose an illustrative embodiment for practicing the invention. Computing device 300 may, for example, represent ID controller 104 of FIGS. 1-2.

Computing device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of computing device 300. Any general-purpose operating system may be employed. Basic input/output system ("BIOS") 318 is also provided for controlling the low-level operation of computing device 300. As illustrated in FIG. 3, computing device 300 also can communicate with the Internet, or some other communications network, such as networks 105 and 205 in FIGS. 1 and/or 2, via network interface unit 310, which is constructed for use with various communication protocols including the TCP/IP protocol. Network interface unit 310 is sometimes known as a transceiver, transceiving device, network interface card (NIC), and the like.

Computing device 300 may also include an SMTP handler application for transmitting and receiving email. Computing device 300 may also include an HTTP handler application for receiving and handing HTTP requests, and an HTTPS handler application for handling secure connections. The HTTPS handler application may initiate communication with an external application in a secure fashion.

Computing device 300 also includes input/output interface 324 for communicating with external devices, such as a mouse, keyboard, scanner, or other input devices not shown in FIG. 3. Computing device 300 may further include additional mass storage facilities such as CD-ROM/DVD-ROM drive 326 and hard disk drive 328. Hard disk drive 328 is utilized by computing device 300 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, and so forth. In one embodiment, mass storage may further include applications such ID control manager 354, and/or watermark analyzer 356. In one embodiment, ID control manager 354 may also be configured and arranged to operate as a firmware component distinct from within mass storage of computing device 300.

ID control manager 354 is configured to extract an A/V synchronization fingerprint from an A/V signal, and to provide the extracted fingerprint to a data store, such as fingerprint store 106 of FIG. 1, or the like. ID control manager 354 may further provide control information to another computing device, such as ID encoders 108-109, and/or ID encoders 208-209. Such control information may include for example, a unique base identifier value, a signal indicating that the receiving device is to increment an identifier from the unique identifier base value, and the like. In one embodiment, ID control manager 354 may employ a process such as described below in conjunction with FIG. 7.

Watermark analyzer 356 may include virtually any component configured to receive an identifier from another device, and to determine information about the identifier, including, but not limited to, a content owner, a timestamp, an ID encoder device that encoded the identifier, or the like. In one embodiment, a device similar to computing device 400 of FIG. 4, for example, may be employed to extract the fingerprint from a copied A/V signal, and provide the extracted fingerprint to watermark analyzer 356. In one embodiment, watermark analyzer 356 may also receive additional information about the copied A/V signal, including, for example, a title, a content owner, or the like. Watermark analyzer 356 may then compare the extracted fingerprint to a stored fingerprint to extract the identifier. The extracted identifier may then be provided to the content owner, along with additional information, such as any obtained timestamps, ID encoder information, or the like.

Figure 4:
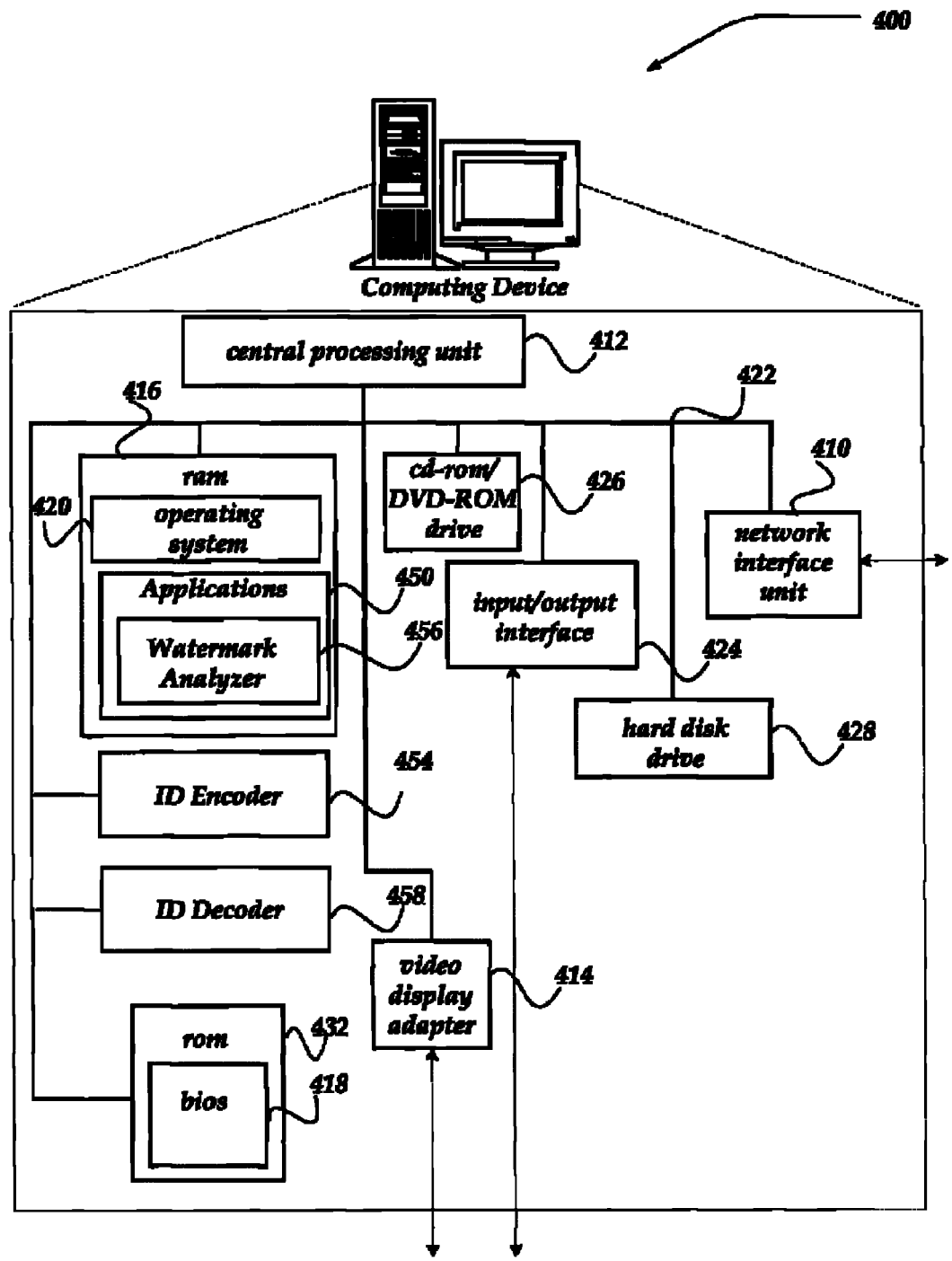
FIG. 4 shows one embodiment of a computing device configured and arranged to at least encode an identifier ("watermark") into an A/V signal.

FIG. 4 shows one embodiment of a computing device configured and arranged to at least encode an identifier ("watermark") into an A/V signal. Computing device 400 may also be configured and arranged, in one embodiment, to extract a fingerprint from an A/V signal, and/or to employ the extracted fingerprint to determine an associated identifier ("watermark").

Computing device 400 may include many more components than those shown. The components shown, however, are sufficient to disclose an illustrative embodiment for practicing the invention. Computing device 400 may, for example, represent one embodiment of duplicator 210 of FIG. 2.

Computing device 400 includes processing unit 412, video display adapter 414, and a mass memory, all in communication with each other via bus 422. The mass memory generally includes RAM 416, ROM 432, and one or more permanent mass storage devices, such as hard disk drive 428, tape drive, optical drive, and/or floppy disk drive. The mass memory stores operating system 420 for controlling the operation of computing device 400. Any general-purpose operating system may be employed. Basic input/output system ("BIOS") 418 is also provided for controlling the low-level operation of computing device 400. As illustrated in FIG. 4, computing device 400 also can communicate with the Internet, or some other communications network, such as networks 105 and 205 in FIGS. 1 and/or 2, via network interface unit 410, which is constructed for use with various communication protocols including the TCP/IP protocol. Network interface unit 410 is sometimes known as a transceiver, transceiving device, network interface card (NIC), and the like.

Computing device 400 may also include an SMTP handler application for transmitting and receiving email. Computing device 400 may also include an HTTP handler application for receiving and handing HTTP requests, and an HTTPS handler application for handling secure connections. The HTTPS handler application may initiate communication with an external application in a secure fashion.

Computing device 400 also includes input/output interface 424 for communicating with external devices, such as a mouse, keyboard, scanner, or other input devices not shown in FIG. 4. Computing device 400 may further include additional mass storage facilities such as CD-ROM/DVD-ROM drive 426 and hard disk drive 428. Hard disk drive 428 is utilized by computing device 400 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 450 are loaded into mass memory and run on operating system 420. Examples of application programs include email programs, schedulers, calendars, transcoders, database programs, word processing programs, spreadsheet programs, and so forth. Application programs may also include a variety of programs configured to duplicate an A/V signal. In one embodiment, operating system 420 may include commands, scripts, or the like, configured to duplicate an A/V signal. In one embodiment, mass storage may further include applications such watermark analyzer 456, which may be configured to operate substantially similar to watermark analyzer 356 of FIG. 3.

Computing device 300 may include ID encoder 454. ID encoder 454 is configured and arranged to receive an A/V signal to be duplicated, accessed, retransmitted, or played, and to encode the A/V signal with a unique identifier. In one embodiment, ID encoder 454 may encode the audio component of the A/V signal with the identifier, however, the invention is not so limited, and ID encoder 454 may also encode the video component, or both the audio and the video component with one or more identifiers. In one embodiment, ID encoder 454 may employ a process such as described below in conjunction with FIG. 8 to perform at least some of its actions.

Computing device 300 may also include ID decoder 458, in one embodiment. ID decoder 458 may be configured and arranged to receive a copied A/V signal and to extract a fingerprint from the A/V signal. In one embodiment, ID decoder 458 may be further configured to access a data store and compare the extracted fingerprint to a master fingerprint to determine the unique identifier associated with the copied A/V signal. In another embodiment, ID decoder 458 may provide the extracted fingerprint to watermark analyzer 456, which may then perform the comparisons to determine the identifier. In any event, ID decoder 458 and/or watermark analyzer 456 may then provide the determined unique identifier along with additional information to a content owner, or the like, for use in tracing the copied A/V signal to a source. ID decoder 458 (in conjunction with watermark analyzer 456, in one embodiment) may employ a process such as described below in conjunction with FIG. 9 to perform such actions.

Figure 5:
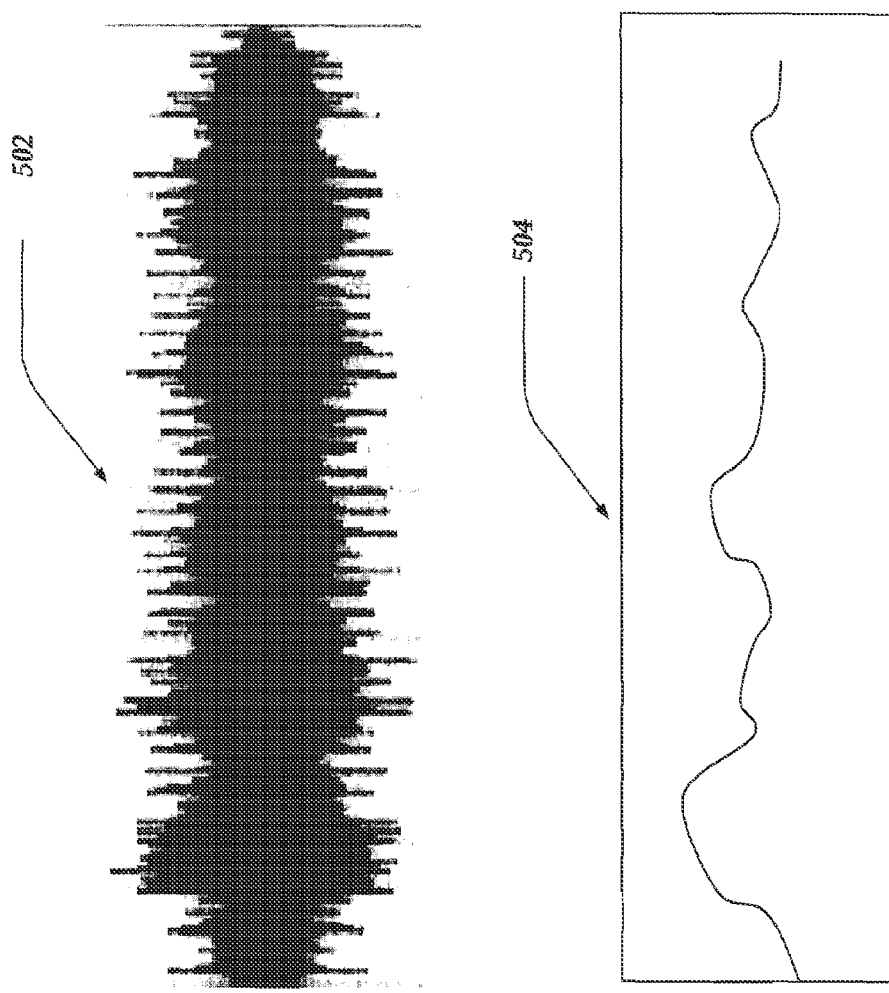
FIG. 5 illustrates functional diagrams generally showing one embodiment of an A/V signal and associated synchronization fingerprint.

FIG. 5 illustrates functional diagrams generally showing one embodiment of an A/V signal and associated synchronization fingerprint. FIG. 5 illustrates only one example of such signals and is not intended to suggest any limitation as to the scope of use or functionality of the present invention.

Shown in FIG. 5 are audio waveform 502 and JPEG word-count 504. JPEG word-count 504 represents a sequence of video frames from one example of an A/V signal.

However, before the word count technique is described in more detail, it should be appreciated that the present invention contemplates the use of a fingerprinting process which in effect analyzes a level of complexity of selected frames (or selected groups of frames or pictures) of an A/V signal. (The distinction between "frames" and "groups of frames or pictures" is explained below.) In this approach, each selected frame or group of frames (where the selected frames may be every frame, the first n frames, or every nth frame, for example) may be analyzed to calculate its level of complexity. Frame complexity may then be tracked or "plotted" to discern a trend in the level of complexity of the series of selected frames. An exemplary process for measuring and tracking the complexity of frames may be based on a technique that uses the word count technique.

To understand the word count technique (and to understand the distinction between single pictures and groups of pictures), it should be appreciated that, generally, A/V signals (such as a movie, video, or similar audio/video content) may be stored in a file format that utilizes some form of data compression. Some file formats use a simple single frame compression technique in which the series of frames of the A/V signal may be stored as a series of compressed single frames. When single frame compression techniques are used for A/V file storage, the total number of words required to store each frame may be measurable so that a word count may be calculated for each frame. If the level of complexity of a particular frame is high (e.g., relative to the complexity of other frames in the A/V signal), then the word count for that particular frame is high. With this type of file compression, a word count image (that is, per frame) may be measured and plotted. If word count per frame is plotted over the entire length of the A/V signal, for example, (or, alternatively, for selected frames) a waveform can be derived from this data that may be a unique media file identifier (or "fingerprint") for the source or "known" A/V signal. This media file identifier may be referred to as a "word count identifier." This fingerprint based on word count per selected frame may be a robust and highly reliable identifier because it may be essentially unchanged even if the source A/V signal may be altered from its original form by, for example, being recompressed, distorted or re-recorded at a different bit resolution or "bit depth" (such as 24 bit as opposed to 16 bit, for example).

However, most A/V file storage formats utilize compression techniques that compress several sequential frames as a group. Commonly used A/V file compression techniques (such as MPEG) use a key frame-based compression scheme that compresses groups of pictures (also referred to as "GOPs") together. (It will be noted that the terms "image," "frame" and "picture" are considered to be synonymous herein. The terms "video," "A/V signal," "A/V content," and "movie" are also considered be synonymous herein as well. With this type of file compression, a word count per group of pictures (that is, per "GOP") may be measured and plotted. If word count per GOP may be plotted over the entire length of the video, for example, (or for selected GOPs) a waveform can be derived from this data that may be a unique media file identifier (or word count identifier) for the source or "known" A/V signal. This word count identifier (based on word count per GOP) may be robust and highly reliable because it may be essentially unchanged even if the source A/V signal may be altered by being, for example, recompressed, distorted or re-recorded at a different bit resolution or "bit depth" (such as 24 bit as opposed to 16 bit, for example).

Because each picture (when a single frame compression technique such as JPEG is used) or each group of pictures (when a multiple frame compression technique such as MPEG is used) of a video file can be considered to be encoded as series of words, the number of words used to encode a particular picture or a particular GOP in the compressed domain is referred to herein as a "word count". Hence, the word count methodology (and the use of a word count technique to produce a word count identifier) can be implemented on and is applicable to video files that use any video compression technique. Hence, although the present discussion of the word count technique focuses on multi-frame compression techniques such as MPEG, it is also applicable to single frame compression techniques such as JPEG.

Complexity in video compression algorithms based on the discrete cosine transformation (which includes the JPEG algorithm and the MPEG compression algorithm) is a measure of how much of each image lies in the different frequency bands. If, for example, all of one particular image lies in one frequency band, then that image may be deemed to have a relatively low level of complexity. As a specific example, if every single frame in a particular video is exactly the same color, the video would have a very low level of complexity and the complexity could be described using a very small number of bits (and thus a very low number of words because each word contains a predetermined number of bits). This would, therefore, yield a very low word count for each image and the word count would be equal for each image of the image. If the word count per image were to be plotted over an entire video, for example, it would yield a straight line.

As another illustration of image complexity, if the pixels in each row in each frame of the video alternate between black and white, the discrete cosine transform of this signal would show that all the information is contained within a high frequency band, with little or no information in the low frequency band.

As still another example of image complexity, if the pixel values are randomly distributed as is the case, for example, when a source of white noise is displayed by each image of a video, the word count for each frame would be extremely high. If these white noise-generated images were encoded in MPEG format, for example, in any group of pictures (that is, going from I-frame to I-frame, or from key frame to key frame), the word count would be very large because each frame shows a very noisy, chaotic image.

The word count of a commercial entertainment movie typically varies from image to image so that a word count can be calculated and plotted for each image. The resulting representation of the word count provides a word count identifier for the entire movie that may be stored in a database and searched against to identify tracked movie files. Moreover, the above discussion on word count may be readily applied to an audio component of the A/V signal.

Employing audio waveform 502 and JPEG word-count 504 of FIG. 5 an A/V synchronization fingerprint may be obtained as a low pass filtered energy envelope of audio waveform 502 synchronized with JPEG word-count 504. The low pass filtered energy envelope may be obtained employing any of a variety of mechanisms such that the resulting fingerprint is highly invariant to distortions that may arise during copying, including compression, encoding, transcoding, frame-rate changing, color gamut changes, sizing, cropping, trapezoidal distortions, and so forth.

Figure 6:
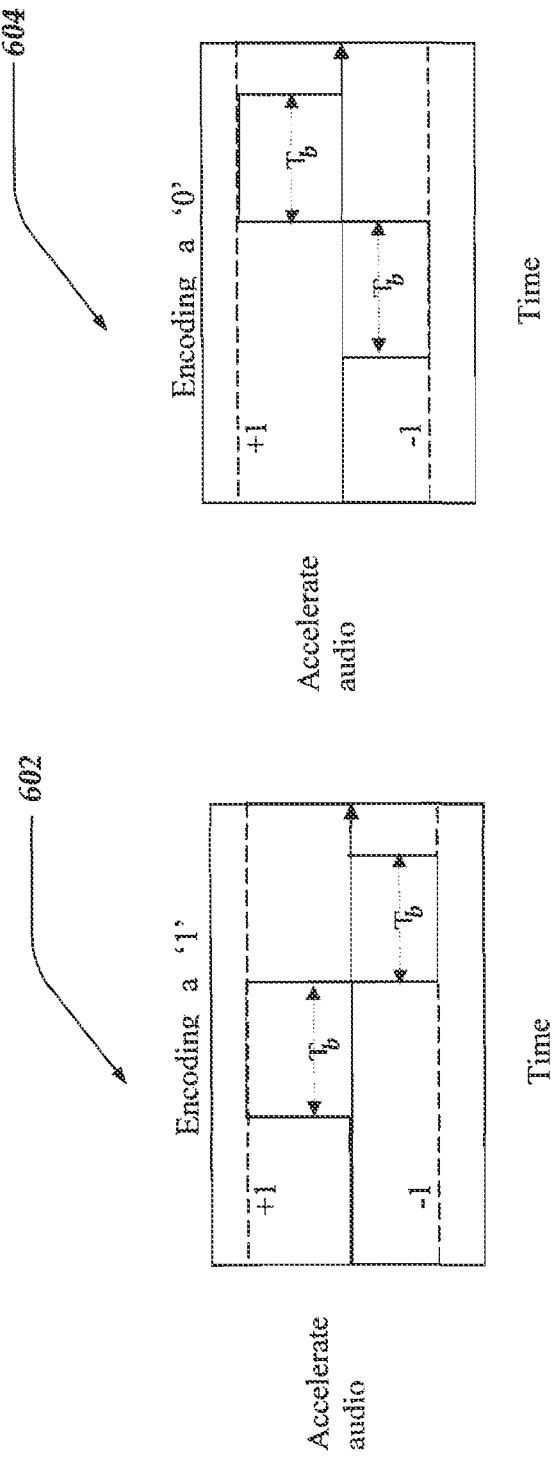
FIG. 6 illustrates functional diagrams generally showing one embodiment of a technique for use in encoding a synchronization watermark into an A/V signal.

FIG. 6 illustrates functional diagrams generally showing one embodiment of an encoding mechanism for an A/V synchronization watermark. In one embodiment, the A/V synchronization relationship of the A/V signal is modified as the A/V signal is being copied.

The modification to the audio component of the A/V signal may be performed within a typical wow-and-flutter specification of most recording devices. Moreover, the synchronization drift that may be introduced is typically no more than about +/−1 field of synchronization difference between the video and the audio components of the A/V signal.

In a typical process, the A/V signal is input to a device, such as ID encoders 108-109 of FIG. 1, which may create the synchronization drift. In one embodiment, the video component is not modified. Rather the video synchronization signal is employed for timing purposes. The audio component may be clocked into a buffer at a rate corresponding to about that of a perfect synchronization, while the audio output may be clocked out of the buffer at a modified rate. Audio samples may be reconstructed to reconcile the different number of output samples. Such reconstruction may employ, for example, interpolations, IIR filtering, FIR filtering, pitch correction of the speeding or slowing of the audio component, and the like.

As shown in FIG. 6, the unique identifier may be encoded as a bit sequence. In one embodiment, each bit within the bit sequence may be encoded using the illustrated Mississippi encoding scheme. However, the invention is not so limited, and virtually any encoding scheme may be employed. FIG. 6 illustrates encoding of a zero bit 402, and encoding of a one bit 404 using the Mississippi encoding scheme.

Encoding of a zero bit 402 may be achieved as a period of no synchronization change followed by a speeding up of the audio component within the A/V signal with respect to the video component for a period of Tb, followed by a slowing down of the audio component with respect to the video component for an equal period Tb.

Similarly, encoding of a one bit 404 may be performed as a period of no synchronization change followed by slowing down of the audio component with respect to the video component for a period of Tb, followed by a speeding up of the audio component with respect to the video component for an equal period Tb.

The overall net effect after encoding a one or a zero bit should introduce substantially no net drift. That is, virtually no change in the overall signal's d.c. component is introduced.

The maximum instantaneous drift typically is no more than about 1 video field, about 1/59.994 seconds (NTSC), or about 1/50 seconds (PAL). Typical studies appear to indicate that human perception normally does not detect such a synchronization error.

The acceleration or deceleration rate could also be constant or could be devised to follow a smooth profile such as a sinusoidal profile. In any case the net effect is directed at minimizing any introduction net drift in synchronization of the A/V components.

The value of period Tb may be determined by any of a variety of mechanisms, including experimentation, engineering judgment, and the like. For example, if Tb were about 5 seconds then, a bit could be about 15 seconds, and a 32 bit ID with 2 stop bits could take about 34×15=510 seconds. So the ID can be repeated approximately every 10 minutes. A 32 bit ID can uniquely ID approximately 4 billion A/V signals. This would enable about 90 seconds of preamble encoded as 'FFFF to allow a phase lock loop of a decoder device to lock onto the Mississippi code.

Generalized Operation

Figure 7:
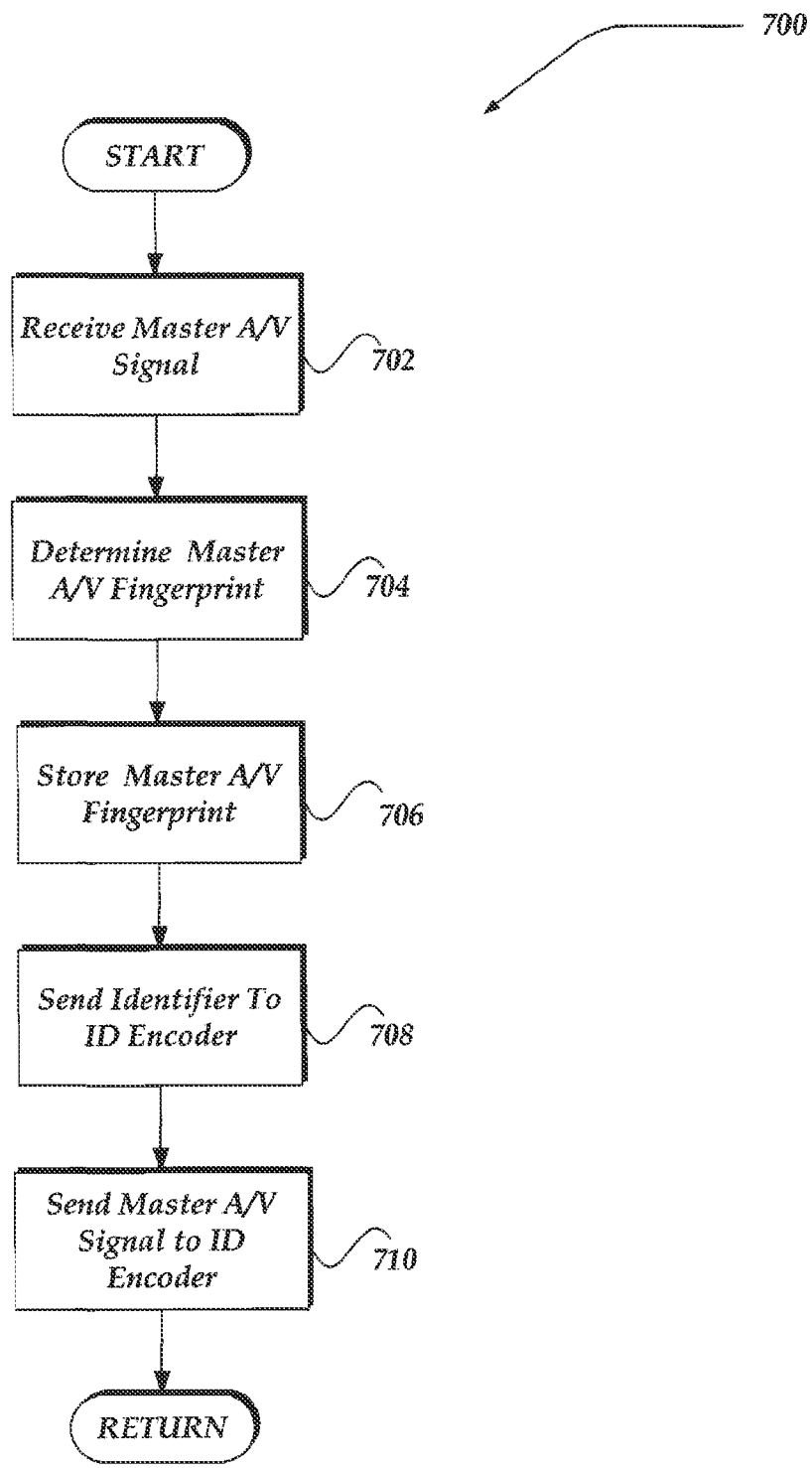
FIG. 7 illustrates a logical flow diagram generally showing one embodiment of a process for extracting a fingerprint from a master A/V signal.

The operation of certain aspects of the invention will now be described with respect to FIGS. 7-9. FIG. 7 illustrates a logical flow diagram generally showing one embodiment of a process for extracting a fingerprint from a master A/V signal.

Process 700 of FIG. 7 begins, after a start block, at block 702, where a master A/V signal is received. It is anticipated that the master A/V signal is to be copied. The master A/V signal may include virtually any content including movies, video games, streaming media, television, text, graphics, and the like.

Processing continues to block 704, where an A/V synchronization fingerprint, or master A/V fingerprint is determined employing a mechanism such as described above. Process 700 continues to block 706, where the determined master A/V fingerprint is provided to a data store. Processing continues next to block 708 where identifier information is sent to an ID encoder. In one embodiment, the identifier information includes a base identifier value. In another embodiment, the identifier information includes a signal indicating that a unique identifier is to be determined by incrementing the base identifier value to another value. Processing then proceeds to block 710, where the master A/V signal is sent to the ID encoder to be encoded during duplication. Process 700 then returns to a calling process to perform other actions.

Figure 8:
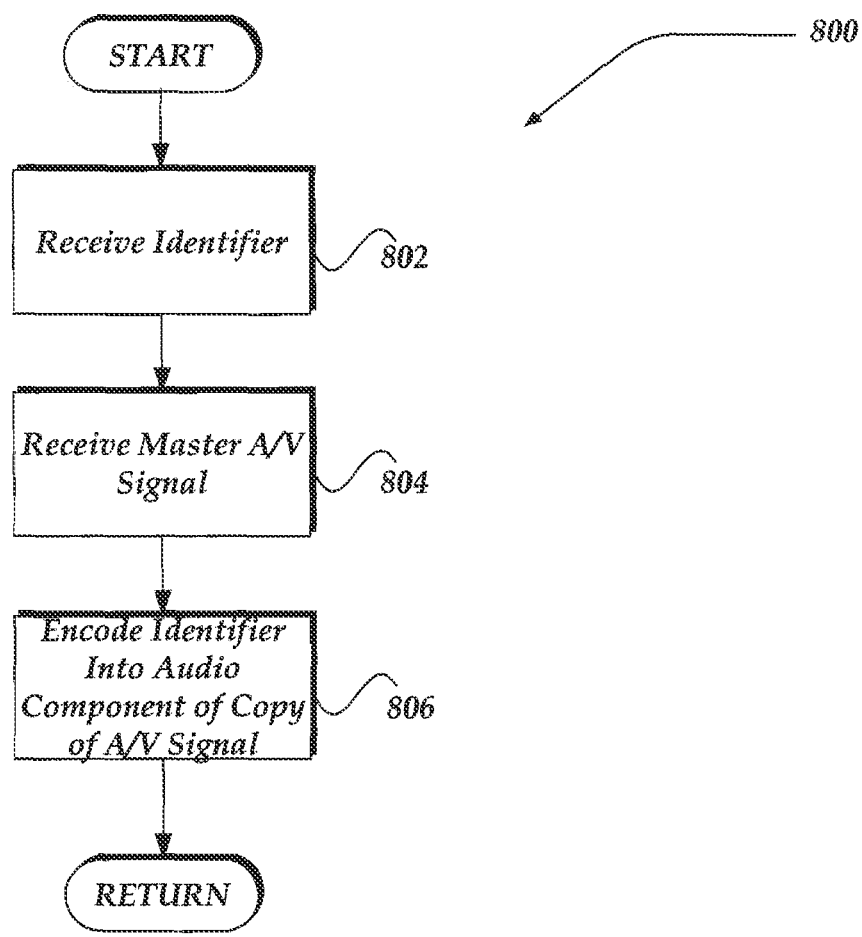
FIG. 8 illustrates a logical flow diagram generally showing one embodiment of a process for encoding an identifier ("watermark") into an A/V signal during duplication.

FIG. 8 illustrates a logical flow diagram generally showing one embodiment of a process for encoding an identifier ("watermark") into an A/V signal during duplication.

Process 800 of FIG. 8 begins, after a start block at block 802, where an identifier is received. In one embodiment, the identifier is a base identifier value. In one embodiment, the identifier is a derived identifier from a local ID, or the like. In one embodiment, the identifier may include or otherwise be based on a timestamp, where the associated time may indicate when the content was accessed, or the like. In another embodiment, the identifier is a value incremented from the base identifier value. In any event, it is intended that the identifier is unique to each copy of the A/V signal.

Process 800 continues to block 804, where the master A/V signal is received. Proceeding to block 806, the identifier is encoded into the audio component of the A/V signal, as described above, as the master A/V signal is copied. Process 800 then returns to a calling process to perform other actions.

Figure 9:
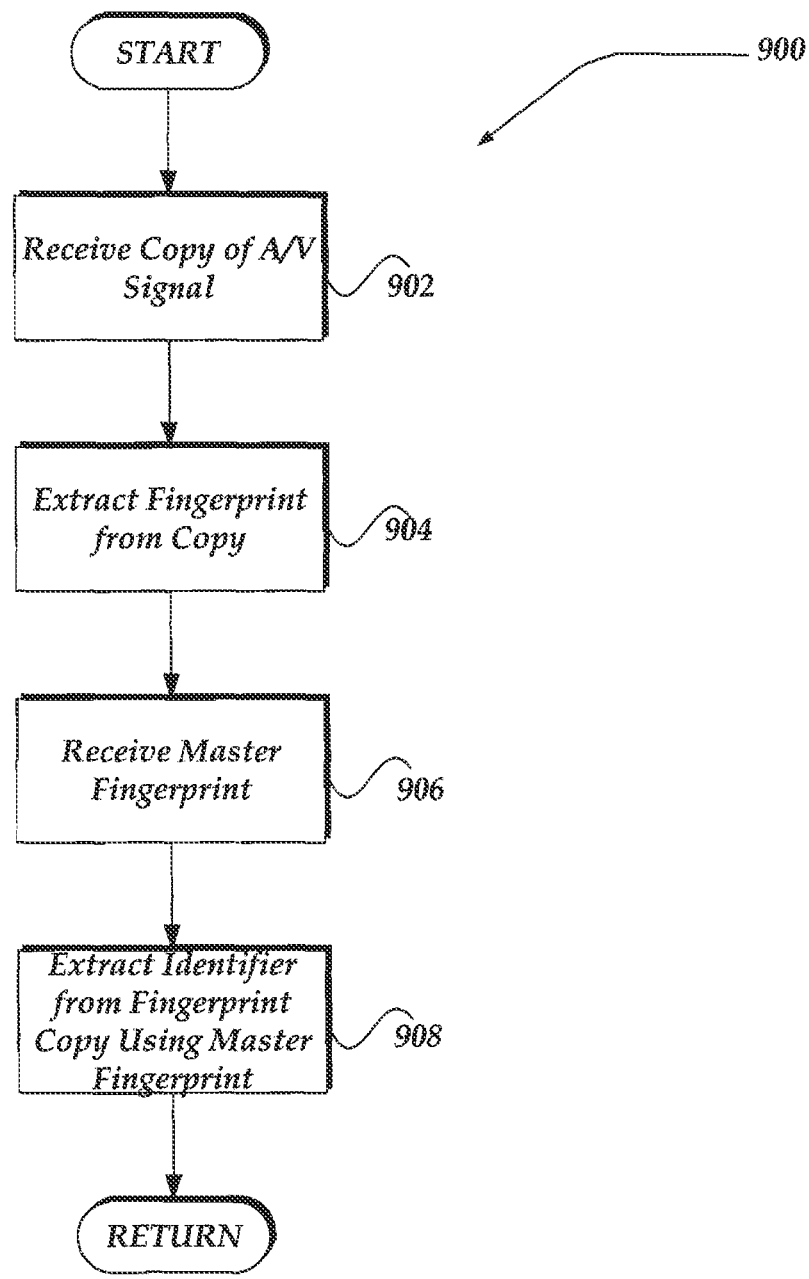
FIG. 9 illustrates a logical flow diagram generally showing one embodiment of a process for extracting the encoded identifier ("watermark") from a copy of the A/V signal for use in tracking a source, in accordance with the present invention.

FIG. 9 illustrates a logical flow diagram generally showing one embodiment of a process for extracting the encoded identifier ("watermark") from a copy of the A/V signal for use in tracking a source.

As shown in the figure, process 900 begins, after a start block, at block 902 where a copy of the A/V signal is received. The copy of the A/V signal may have been obtained from a process such as described above in conjunction with FIG. 8.

Processing proceeds to block 904, where the A/V synchronization fingerprint ("fingerprint") is extracted from the copy of the A/V signal. Extraction of the fingerprint may be performed using any of a variety of mechanisms, including using a low pass filtered energy envelope of the audio component synchronized with a JPEG word-count of the associated video component of the copy of the A/V signal.

Processing continues next to block 906, where a master fingerprint is obtained for the corresponding master A/V signal. The master fingerprint may be obtained from a data store that may be accessible based on any of a variety of information associated with the A/V signal's content, including a title, owner, and the like. Processing then proceeds to block 908 where the unique identifier encoded within the extracted fingerprint from the copy of the A/V signal is determined. Determination of the unique identifier may be achieved, for example, by performing a comparison of the two fingerprints and noting the differences. The unique identifier may then be provided to a content owner, and the like, for use in tracing a source of the copied A/V signal.

The unique identifier may also be employed to perform other actions, including conducting an audit on legitimate distributions of the A/V signal. Examining a licensing agreement associated with the copier and/or the A/V signal to confirm that the copying is legitimate. Where the copying is determined to be unauthorized based on a licensing agreement, or similar digital rights, a notice may be sent to the copier indicating that the copying is unauthorized. In one embodiment, access to additional A/V signals from one or more sources may be restricted. In one embodiment, the unauthorized copier may be sent a bill. In another embodiment, a legitimate copier may also be rewarded with discounts, promotions, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A system for identifying audio/video content using a computer, comprising:
  a non-transitory computer readable medium storing instructions that, when executed by at least one processor, cause the at least one processor to perform actions including:
    receiving the audio/video content, the audio/video content including an audio component and a video component; and
    determining a master audio/video synchronization fingerprint for the audio/video content, the master audio/video synchronization fingerprint identifying a plurality of variations in synchronization between the audio component and the video component;
    determining an identifier, the identifier indicating a source within a distribution stream; and
    modifying at least a portion of an audio/video synchronization fingerprint by adding a plurality of synchronization shifts to the audio/video content to encode the identifier into a copy of the audio/video content, each of the plurality of synchronization shifts including a change in the synchronization between the audio component and the video component, wherein the identifier is determinable by comparing the modified audio/video synchronization fingerprint with the master audio/video synchronization fingerprint; and
  at least one processor.

2. The system of claim 1, wherein encoding the identifier further comprises encoding a timestamp, and wherein the master audio/video synchronization fingerprint is determined based on an audio waveform from the audio/video content and a word-count waveform.

3. The system of claim 1, wherein encoding the identifier further comprises encoding each bit within a bit sequence of the audio/video content using a Mississippi encoding scheme.

4. The system of claim 3, wherein the Mississippi encoding scheme comprises:
  encoding of a zero bit as a period of no synchronization change followed by a speeding up of an audio component within the audio/video content with respect to a video component for a time period, followed by a slowing down of the audio component with respect to the video component for a time period; and
  encoding a one bit as a period of no synchronization change followed by a slowing down of the audio component with respect to the video component for a time period, followed by a speeding up of the audio component with respect to the video component for a time period.

5. The system of claim 1, wherein determining an audio/video synchronization fingerprint comprises comparing a low pass filtered energy envelope of an audio component of the audio/video content with a word count from a video component of the audio/video content.

6. The system of claim 1, wherein the actions further include:
  determining if the copy of the audio/video content is authorized based in part on a license agreement;
  if the copy is unauthorized, sending a notice of the unauthorized copying to an owner of the identification encoding component; and
  if the copy is authorized, sending at least one of a reward, promotion, or discount to the owner of the identification encoding component.

7. A non-transitory computer readable medium that includes instructions, wherein execution of the instructions provides for identifying audio/video content by enabling actions, including:
  receiving the audio/video content, the audio/video content including an audio component and a video component;
  determining a master audio/video synchronization fingerprint for the audio/video content, the master audio/video synchronization fingerprint identifying a plurality of variations in synchronization between the audio component and the video component;
  determining an identifier, the identifier indicating a source within a distribution stream; and
  modifying at least a portion of an audio/video synchronization fingerprint by adding a plurality of synchronization shifts to the audio/video content to encode the identifier into a copy of the audio/video content, each of the plurality of synchronization shifts including a change in the synchronization between the audio component and the video component, wherein the identifier is determinable by comparing the modified audio/video synchronization fingerprint with the master audio/video synchronization fingerprint.

8. The non-transitory computer readable medium of claim 7, wherein determining the identifier comprises:
   determining a timestamp associated with a time associated with the encoding;
   determining a local unique identifier configured to uniquely identify an encoding component; and
   combining the local unique identifier with the timestamp to determine the identifier.

9. The non-transitory computer readable medium of claim 7, wherein determining an audio/video synchronization fingerprint comprises:
   comparing a low pass filtered energy envelope of an audio component synchronized with a word count of an associated video component.

10. The non-transitory computer readable medium of claim 7, wherein determining the identifier comprises receiving from another computing device a base identifier useable in determining the identifier.

11. A network device for identifying audio/video content over a network, comprising:
   a transceiver to send and receive data over the network; and
   at least one processor that is operative to perform actions including:
      receiving the audio/video content, the audio/video content including an audio component and a video component;
      determining a master audio/video synchronization fingerprint for the audio/video content, the master audio/video synchronization fingerprint identifying a plurality of variations in synchronization between the audio component and the video component;
      providing at least one of an instruction to determine an identifier, or providing the identifier over the network to another device, the identifier indicating a source within a distribution stream, wherein the other device is configured to modify at least a portion of an audio/video synchronization fingerprint by adding a plurality of synchronization shifts to the audio/video content to encode the unique identifier or a locally determined unique identifier, based on the instruction, into a copy of the audio/video content, each of the plurality of synchronization shifts including a change in the synchronization between the audio component and the video component, wherein the identifier is determinable by comparing the modified audio/video synchronization fingerprint with the master audio/video synchronization fingerprint.

12. The network device of claim 11, wherein encoding the identifier comprises:
   encoding into the audio/video content a zero bit as a period of no synchronization change followed by a speeding up of an audio component within the audio/video content with respect to a video component for a time period, followed by a slowing down of the audio component with respect to the video component for a time period; and
   encoding into the audio/video content a one bit as a period of no synchronization change followed by a slowing down of the audio component with respect to the video component for a time period, followed by a speeding up of the audio component with respect to the video component for a time period, such that a DC component of the audio/video content is substantially unchanged.

13. The network device of claim 11, wherein the actions further comprise:
   receiving the copy of the audio/video content;
   extracting a fingerprint from the copy of the audio/video content using a low pass filtered energy envelope of the audio component synchronized with a word count of the associated video component; and
   extracting the identifier based on a comparison of the extracted fingerprint to a fingerprint of the received audio/video content.

14. The network device of claim 11, wherein the plurality of synchronization shifts added to the audio/video content encode the identifier at a plurality of locations within the audio/video content.

15. A computing device that is operative to mark audio/video content for use in identifying the audio/video content, comprising:
   a memory component for storing data; and
   at least one processing component for executing instructions that enables actions including:
      receiving the audio/video content, the audio/video content including an audio component and a video component; and
      modifying at least a portion of an audio/video synchronization fingerprint of the audio/video content to encode an identifier that indicates a source within a distribution stream into a copy of the audio/video content by:
         encoding into the audio/video content a zero bit as a period of no synchronization change between the audio component and the video component, followed by a speeding up of the audio component within the audio/video content with respect to the video component within the audio/video content for a time period, followed by a slowing down of the audio component with respect to the video component for a time period; and
         encoding into the audio/video content a one bit as a period of no synchronization change between the audio component and the video component, followed by a slowing down of the audio component with respect to the video component for a time period, followed by a speeding up of the audio component with respect to the video component for a time period, wherein the identifier is determinable by comparing the modified audio/video synchronization fingerprint with a master audio/video synchronization fingerprint that corresponds to the received audio/video content, the master audio/video synchronization fingerprint identifying a plurality of variations in synchronization between the audio component and the video component.

16. The computing device of claim 15, wherein the identifier further comprises a timestamp.

17. The computing device of claim 15, wherein the encodings are configured to introduce substantially no change to an overall DC component of the audio/video content.

18. A method of using a computer to identify audio/video content over a network, comprising:
   receiving the audio/video content at a first computer, the audio/video content including an audio component and a video component;
   determining a master audio/video synchronization fingerprint for the audio/video content, the master audio/video synchronization fingerprint identifying a plurality of variations in synchronization between the audio component and the video component;
   determining an identifier, the identifier indicating a source within a distribution stream;

modifying at least a portion of an audio/video synchronization fingerprint by adding a plurality of synchronization shifts to the audio/video content to encode the identifier into a copy of the audio/video content, each of the plurality of synchronization shifts including a change in the synchronization between the audio component and the video component, thereby creating a copy including of the audio/video content that includes the plurality of synchronization shifts;

extracting the identifier from the copy of the audio/video content based on a comparison of the modified audio/video synchronization fingerprint with the master audio/video synchronization fingerprint; and if the identifier indicates the copied audio/video content is unauthorized, performing an action.

19. The method of claim 18, wherein the action comprises at least one of sending a notice to an owner of a computer with which the copy was made, or inhibiting access to another audio/video content.

20. The method of claim 18, further comprising:
if the identifier indicates that the copied audio/video content is authorized, sending to an owner of a computer with which the extracting was performed at least one of a discount, a reward, or a promotion.

21. A non-transitory computer-readable storage medium configured to include program instructions that when executed by a processor perform the method of claim 18.

* * * * *